United States Patent
Hillstrom et al.

(10) Patent No.: US 9,258,051 B2
(45) Date of Patent: Feb. 9, 2016

(54) OPTIMIZATION OF TRANSMIT SIGNAL POLARIZATION OF AN ADAPTIVE POLARIZATION ARRAY (APA)

(71) Applicant: LHC2 INC, Liberty Lake, WA (US)

(72) Inventors: Timothy Leonard Hillstrom, Liberty Lake, WA (US); Robert J. Conley, Liberty Lake, WA (US)

(73) Assignee: LHC2 INC, Liberty Lake, WA (US)

( * ) Notice: Subject to any disclaimer, the term of this patent is extended or adjusted under 35 U.S.C. 154(b) by 296 days.

(21) Appl. No.: 13/915,625

(22) Filed: Jun. 11, 2013

(65) Prior Publication Data

US 2013/0331039 A1 Dec. 12, 2013

Related U.S. Application Data (60) Provisional application No. 61/658,148, filed on Jun. 11, 2012.

(51) Int. Cl.
*H04W 24/00* (2009.01)
*H04B 7/10* (2006.01)
*H01Q 21/24* (2006.01)

(52) U.S. Cl.
CPC .............. *H04B 7/10* (2013.01); *H01Q 21/24* (2013.01); *H01Q 21/245* (2013.01)

(58) Field of Classification Search
CPC .............. H04W 24/00; H04B 17/0042; H04B 17/0057; H04B 17/309; H04B 7/0857; H04L 1/0026
USPC .......... 455/67.11, 67.13, 67.16, 115.1, 226.1, 455/226.2, 226.3; 343/756
See application file for complete search history.

(56) References Cited

U.S. PATENT DOCUMENTS

| | | | | |
|---|---|---|---|---|
| 6,018,317 | A * | 1/2000 | Dogan et al. | 342/378 |
| 6,208,295 | B1 * | 3/2001 | Dogan et al. | 342/378 |
| 6,215,983 | B1 * | 4/2001 | Dogan et al. | 455/63.1 |
| 6,535,666 | B1 * | 3/2003 | Dogan et al. | 385/31 |
| 6,658,234 | B1 * | 12/2003 | Dogan et al. | 455/63.1 |
| 2004/0264592 | A1 * | 12/2004 | Sibecas et al. | 375/267 |
| 2007/0047678 | A1 | 3/2007 | Sibecas et al. | |
| 2007/0191067 | A1 | 8/2007 | Nguyen et al. | |
| 2009/0103720 | A1 | 4/2009 | Karayil Thekkoott Narayanan | |
| 2009/0197544 | A1 | 8/2009 | Petersson et al. | |
| 2009/0213453 | A1 * | 8/2009 | Yao | 359/301 |
| 2010/0003034 | A1 * | 1/2010 | Pratt et al. | 398/152 |
| 2010/0098044 | A1 | 4/2010 | Pratt et al. | |
| 2011/0032159 | A1 | 2/2011 | Wu et al. | |
| 2012/0302155 | A1 | 11/2012 | Marsolais et al. | |
| 2012/0329416 | A1 * | 12/2012 | Hillstrom et al. | 455/226.3 |

OTHER PUBLICATIONS

Office Action for U.S. Appl. No. 13/529,968, mailed on Nov. 6, 2013, Timothy Leonard Hillstrom, "Adaptive Polarization Array (APA)," 12 pages.
PCT Search Report mailed Jan. 31, 2013 for PCT application No. PCT/US12/43836, 9 pages.
Office action for U.S. Appl. No. 13/529,968, mailed on Jun. 10, 2014, Hillstrom et al., "Adaptive Polarization Array (APA)," 19 pages.

* cited by examiner

*Primary Examiner* — Minh D Dao
(74) *Attorney, Agent, or Firm* — Lee & Hayes, PLLC (57) ABSTRACT

An Adaptive Polarization Array (APA) Algorithm is described for analyzing a wireless signal transmitted by an entity to determine a received polarization of the received wireless signal at a non-coherent receiver. The APA Algorithm determines a transmit polarization state for a transmitter to transmit signals to the entity based in part on the determined received polarization. The transmitter is an arbitrary-polarized transmitter configured to transmit signals at any polarization.

17 Claims, 3 Drawing Sheets

OPTIMIZATION OF TRANSMIT SIGNAL POLARIZATION OF AN ADAPTIVE POLARIZATION ARRAY (APA)

REFERENCE TO RELATED APPLICATION

This patent application claims the benefit of U.S. Provisional Application Ser. No. 61/658,148, entitled "Optimization of Transmit Signal Polarization of an Adaptive Polarization Array (APA)," filed Jun. 11, 2012, the disclosure of which is incorporated by reference herein in its entirety. This patent application is related to U.S. application Ser. No. 13/529,968, entitled "Adaptive Polarization Array (APA)," filed Jun. 21, 2012, the disclosure of which is incorporated by reference herein in its entirety.

BACKGROUND

Wireless communication has become an integral part of modern life in personal and professional realms. It is used for voice, data, and other types of communication. Wireless communication is also used in military and emergency response applications. Communications that are made wirelessly rely on the electromagnetic spectrum as the carrier medium. Unfortunately, the electromagnetic spectrum is a limited resource.

Although the electromagnetic spectrum spans a wide range of frequencies, only certain frequency bands are applicable for certain uses due to their physical nature and/or due to governmental restrictions. Moreover, the use of the electromagnetic spectrum for wireless communications is so pervasive that many frequency bands are already over-crowded. This crowding may cause interference between and among different wireless communication systems.

Such interference jeopardizes successful transmission and reception of wireless communications that are important to many different aspects of modern society. Wireless communication interference can necessitate retransmissions, cause the use of ever greater power outlays, or even completely prevent some wireless communications. Consequently, there is a need to wirelessly communicate in the presence of electromagnetic interference that may otherwise hinder the successful communication of information.

Multipath fading results in reduced communications reliability, particularly where mobile devices pass through signal fades. Linearly polarized communication systems are generally more susceptible to multipath fading than elliptically or circularly polarized systems. Various mobile and stationary wireless systems often employ an omni-directional antenna pattern on their receivers and/or transmitters. An omni-directional antenna is characterized by an azimuthal radiation pattern that exhibits minimal antenna gain variation. Dual polarized (D-pol) omni-directional antennas allow for an increase in data throughput by exploiting nominally orthogonal vertical and horizontal polarizations associated with individual respective vertical and horizontal channels "Vertical" and "horizontal" are commonly used as a convenient shorthand for any two nominally orthogonal polarization states.

However, due to the nature of systems having D-pol omni-directional antennas, the relative orientation of the vertical and horizontal polarizations between transmit and receive antennas may vary based on movement within a mobile system, and/or other inherent sources of transmit-receive antenna polarization misalignment, such as polarization scattering in a communication path, fading differences in vertical and horizontal signal components, etc. Additionally, the relative orientation of the vertical and horizontal polarizations in some antennas may be modified electronically, such as in adaptive circularly and elliptically polarized antenna systems.

Non-equal polarization is commonly defined by two or more polarization states separated from each other on the Poincaré Sphere. In contrast, exactly orthogonal polarization is defined by two polarization states separated exactly by 180 degrees on the Poincaré Sphere. Additionally, nominally orthogonal polarization is defined by two or more polarization states that may deviate from being exactly orthogonal based on standard commercial manufacturing variations or tolerances.

There are a number of existing methods that address polarization mismatch between a transmitter and a receiver as well as multipath fading. For example, spatial diversity uses two or more antennas separated in space, thereby experiencing differing fading environments. Polarization diversity uses two or more antennas exhibiting differing polarization states. These two diversity techniques can take on various implementations. For example, a technique referred to as switched diversity selects one of the antennas that exhibits the best quality metric. Maximum Ratio Combining (MRC) combines the outputs of all antennas simultaneously to maximize the Signal to Noise Ratio (SNR). Minimum Mean Square Error (MMSE) combining, like MRC, makes use of one or more antenna and can maximize a Signal to Interference plus Noise Ratio (SINR). However, MMSE requires carrier recovery as an integral component of the algorithm, so it is limited to coherent communication systems. MMSC cannot be used to optimize the SINR of signals with unknown carrier phase if the initial SINR is too low to allow carrier recovery.

Many wireless systems, such as various mobile systems, automated meter reading (AMR) installations and advanced metering infrastructure (AMI) installations, often include non-coherent systems that do not support carrier recovery, as well as coherent systems that require carrier recovery. Wireless systems may also exploit a Time Division Duplex (TDD) scheme that requires only one channel for transmitting downlink (i.e., forward link) and receiving uplink (i.e., reverse link) sub-frames at two distinct time slots. Techniques may be employed, for example, at concentrators and/or repeaters that maximize SINR of a received uplink signal from an endpoint via use of an Adaptive Polarization Array (APA) and suitable signal processing capabilities. However, due to cost constraints, endpoints may not be configured with APA and/or other suitable signal processing capabilities. For example, in AMR and AMI systems, the polarization of a given endpoint's receiver and transmitter is commonly fixed. Therefore, there is a need for entities, such as concentrators and repeaters, to provide a downlink signal with a polarization that optimizes SINR at a receiving endpoint.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Introduction

A polarization state of a signal from a transmitting antenna may undergo polarization scattering as it passes through and/or is reflected off objects in a communications channel. Any change in the polarization state of a signal as received at the receiving antenna, such as due to scattering in the communication channel, is referred back to the transmitting antenna as the apparent polarization of the transmitting antenna.

This disclosure relates to techniques for an Adaptive Polarization Array (APA) Algorithm for adjusting the polarization of one or more antennas over all polarization states. As an example, a polarization state of a transmit antenna used to transmit a signal to a receiving entity may be adaptively adjusted to maximize a quality of the signal received by the receiving entity. In various embodiments, the quality of the signal may be maximized by directly determining a polarization state for the transmit antenna that minimizes polarization scattering and/or path loss caused by polarization misalignment between the transmit antenna and an antenna of the receiving entity.

This disclosure describes an APA algorithm that may be utilized to determine the polarization state for the transmit antenna. In various embodiments, an APA algorithm is utilized to determine a polarization of a signal received from the receiving entity, and use that polarization to determine a polarization state for the transmit antenna for communicating back to the receiving entity. The transmit antenna is configured to use the determined polarization state to transmit a signal to the receiving entity that maximizes a quality of the transmitted signal as received by the receiving entity.

Example Environment

Figure 1:
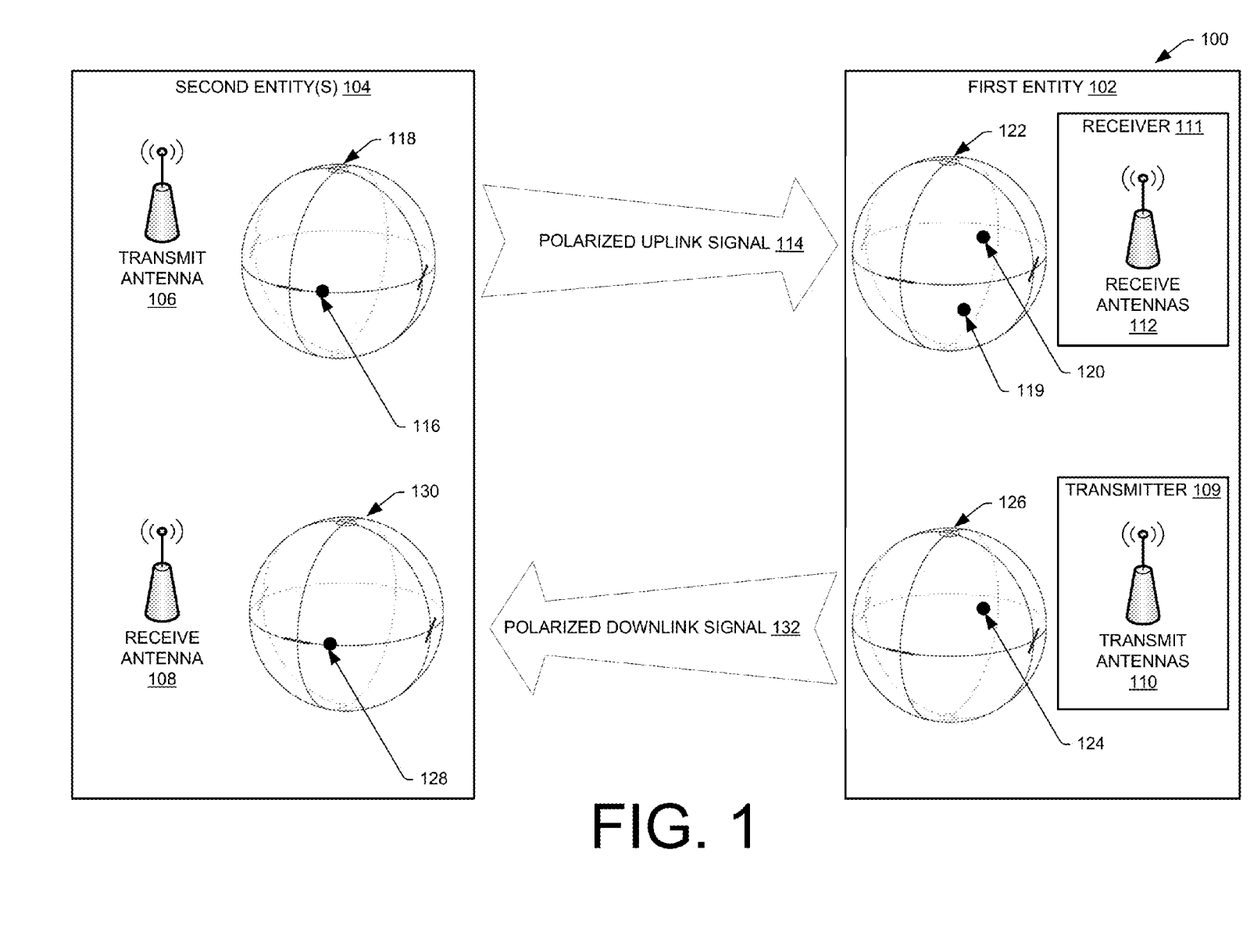
FIG. 1 illustrates a schematic view of polarization states of signals communicated between a first entity and a second entity.

FIG. 1 illustrates an example environment 100 of a wireless system for transmitting and receiving polarized signals (e.g., dual-polarized signals) between a first entity 102 and a second entity 104. As an example, second entity 104 includes transmit antenna 106. Transmit antenna 106 can be a dual polarized (D-pol) antenna that allows for an increase in data throughput by exploiting nominally orthogonal vertical and horizontal polarizations associated with individual respective vertical and horizontal channels. Second entity 104 also includes a receive antenna 108. Receive antenna 108 can also be a D-pol antenna. Transmit antenna 106 and receive antenna 108 are shown as separate antennas for simplicity of illustration, however, they can be the same antenna used for transmitting and receiving wireless signals. As an example, transmit antenna 106 and receive antenna 108 can be a same antenna.

As an example, the first entity 102 can include a concentrator or repeater in a non-coherent wireless system having an arbitrary-polarized transmitter 109 that includes at least two transmit antennas 110 having non-equal polarization to emulate a single transmit antenna having adjustable transmit polarization states. The arbitrary-polarized transmitter 109 can include a fully arbitrary-polarized transmitter configured to adjust the emulated single transmit antenna 110 to any polarization state. The wireless system can include a coherent system or a non-coherent system, for example, as typically used in automated meter reading (AMR) installations and advanced metering infrastructure (AMI) installations. The wireless system can also include a coherent system where the receiver SINR is so degraded as to eliminate the possibility of successful carrier recovery. For the purposes of this disclosure, coherent systems experiencing SINR levels which preclude carrier recovery are considered non-coherent systems (e.g., coherent systems where the receiver receives signals in a non-coherent manner or fashion). As an example, the wireless system includes one or more second entities 104 that communicate with the first entity. A second entity 104 may include a wireless endpoint having one or more antennas to facilitate transmission and reception of signals. The wireless system can further include a plurality of first entities 102 and second entities 104. In various embodiments, for a given channel (e.g., portion of wireless bandwidth), the second entity 104 transmits and receives signals via a same, or similar, polarization state.

The first entity 102 can also have one or more receive antennas 112 to facilitate communication with the one or more second entities 104. In various embodiments, the first entity 102 includes an arbitrary-polarized receiver 111 that includes, for example, at least two receive antennas 112 having non-equal polarization to emulate a single receive antenna 112 having adjustable receive polarization states configured to adjust to any polarization state. The first entity 102 can include logic to adjust the arbitrary-polarized receiver 111 to a receive polarization state 119 that maximizes a Signal to Interference plus Noise Ratio (SINR) of a received wireless signal received from the second entity 104.

As an example, second entity 104 transmits polarized uplink signal 114 via an uplink path (e.g., reverse link, channel) to first entity 102. Polarized uplink signal 114 has a particular polarization at transmit antenna 106 of the second entity 104, represented by a polarization state at point 116 on Poincaré Sphere 118. However, due to various factors such as polarization scattering in the uplink path, fading differences in vertical and horizontal signal components in the uplink path, etc., the polarization of uplink signal 114 received at the first entity 102 can differ from the particular polarization of the signal transmitted by second entity 104 at polarization state 116. Thus, in various embodiments, first entity 102 may receive polarized uplink signal 114 at an adjusted polarization state represented by point 119 on Poincaré Sphere 122, that optimizes a received SINR of polarized uplink signal 114, as described in U.S. patent application Ser. No. 13/529,968, which is incorporated by reference herein. First entity 102 determines a received polarization state 120 of polarized uplink signal 114, using techniques as described herein. Notice in this example illustration that a position of point 120 differs from a position of point 116 on their corresponding Poincaré Spheres 122 and 118, respectively.

As an example, in a wireless system that exploits Time-Division Duplex (TDD), where the same channel is used for transmitting downlink and uplink sub-frames at two distinct time slots and channel reciprocity applies, the first entity 102 is configured to exploit characteristics of the signal received from the second entity 104 to determine an optimum polarization state to use for transmitting a signal back to second entity 104 in one or more associated time slots. Therefore, in various embodiments, the first entity 102 optimizes the downlink signal polarization based on algorithmic analysis of the polarized uplink signal 114 received from the second entity 104 at receive antennas 112.

In various embodiments, the first entity 102 performs an algorithmic analysis to determine a downlink polarization, represented by a polarization state at point 124 on Poincaré Sphere 126, that matches, or closely matches, a determined received polarization (e.g., polarization state 120) of polarized uplink signal 114 received by the first entity 102 from a particular second entity 104 via an uplink. As an example, the received polarization may be the actual polarization of the polarized uplink signal 114 at the receive antennas 112 of the first entity 102 in cases of no interference and low noise, such that points 119 and 120 coincide on Poincaré Sphere 122. Thus, in various embodiments, based on the algorithmic analysis, first entity 102 adjusts transmit antennas 110 to a polarization state indicated by point 124, and transmits polarized downlink signal 132 to second entity 104. Second entity 104 receives polarized downlink signal 132 at a polarization state represented by point 128 on Poincaré Sphere 130 (e.g., due to channel reciprocity). In various embodiments, point 128 is located at a point on Poincaré Sphere 130 that is very similar to, or identical to, a location of point 116 on Poincaré Sphere 118.

However, there are practical problems in setting the downlink polarization substantially equal to the received polarization, such as:
1) The received polarization state 120 at receive antennas 112 of receiver 111 is not known.
2) Current methods for calculating received polarization represented by point 120 for non-coherent systems, as well as coherent systems that receive a signal at a very low (e.g., negative) SINR that prevents successful carrier recovery, are not accurate and often result in extreme cross-polarization.

Methods and apparatuses are described herein for a first entity 102 to produce an optimally polarized downlink signal 132 for each associated second entity 104 (e.g., endpoints) that it communicates with.

In various embodiments, the first entity 102 utilizes a direct solution to determine an optimal downlink polarization for each second entity 104. As an example, the direct solution may be based at least in part on an uplink signal received from each endpoint, even for wireless systems that are non-coherent systems, as well as coherent systems where the receiver SINR is so degraded as to eliminate the possibility of successful carrier recovery. The first entity 102 adjusts its arbitrary-polarized transmitter 109 to a polarization state that provides a transmitted signal having the optimal downlink polarization for each endpoint. As an example, for subsequent communications between first entity 102 and a particular second entity 104, first entity 102 maintains values associated with an estimated (e.g., calculated) received polarization state associated with signals received from each second entity 104 in storage. Upon determining a requirement to transmit a wireless signal to a particular second entity 104, first entity 102 retrieves the values associated with the particular second entity 104 from the storage, and applies the values to adjust the arbitrary-polarized transmitter 109 to transmit the wireless signal at the estimated received polarization state previously received from the particular entity second 104 to the particular second entity 104.

While described individually, the foregoing embodiments are not mutually exclusive and any number of embodiments may be present in a given implementation. Moreover, other algorithms, antennas, systems, apparatuses, methods, devices, arrangements, mechanisms, approaches, etc. are described herein.

Algorithm for Solution of Optimal Downlink Polarization

As an example, a polarization of a wireless signal received at a first entity 102 is determined such that the first entity 102 creates a wireless signal with a polarization that matches, or closely matches, the polarization of the received wireless signal (e.g., determined polarization state 120). As an example, the first entity 102 receives a first wireless signal at non-coherent receiver 111, determines or estimates (e.g., calculates) a received polarization state of the first wireless signal, adjusts a transmit polarization state of transmitter 109 to an adjusted transmit polarization state based at least in part on the determined or estimated received polarization state and transmits a second wireless signal at the adjusted transmit polarization state. As an example, the first wireless signal is an uplink signal transmitted by an endpoint and the second wireless signal is a downlink signal for transmission to the endpoint. The first entity transmits the second wireless signal with a polarization that matches, or at least approximates, the received polarization of the uplink signal transmitted by the endpoint.

In various embodiments, the received polarization is determined by maximizing the following metric:

$$Cvar(sp(p),r), \tag{1}$$

where
$sp(p)$=the power array of the received signal (e.g., the first wireless signal, uplink signal 114), calculated using receiver polarization state "p" (e.g., the received polarization to be determined), and
$r$=the power array of the signal reference (e.g., preamble or other known reference).

The polarization state "p" (e.g., point 120) can be specified as a point on a Poincaré Sphere using the following parameters:
"a"=normalized weighting of the vertical channel, and
"thdf"=added phase differential of the horizontal carrier relative to the vertical carrier The range of these parameters may be specified as:

$$0<=a<=1$$

$$-180°<=thdf<=180°$$

Let:
x=complex array of the vertical component of the uplink signal at the concentrator antenna (e.g., "a vertical channel" complex baseband array over a preamble or other known reference interval at the first entity's receiver antenna 112) and y=complex array of the horizontal component of the uplink signal at the concentrator antenna (e.g., "a horizontal channel" complex baseband array over a preamble or other known reference interval at the first entity's receiver antenna 112).

For purposes of this disclosure, a preamble interval may be defined as any interval or intervals of a transmit and/or receive signal which contain unique and/or predetermined information.

Define:

$$exycr := \text{mean } (\overrightarrow{(x \cdot \overline{y} \cdot r)}) \tag{2}$$

$$er := \text{mean } (r) \tag{3}$$

$$exyc := \text{mean } (\overrightarrow{(x \cdot \overline{y})}) \tag{4}$$

$$thcp := \arg(exycr - er \cdot exyc) \cdot \frac{180}{\pi} \tag{5}$$

Where:
thcp=optimal solution of thdf.
Define:

$$Q_i := x_i \cdot \overline{y}_i \cdot e^{-j \cdot thcp \cdot \frac{\pi}{180}} + \overline{(x_i \cdot \overline{y}_i \cdot e^{-j \cdot thcp \cdot \frac{\pi}{180}})} \tag{6}$$

-continued $$b := \text{mean}((\overrightarrow{x \cdot \overline{x} \cdot r})) - er \cdot \text{mean}(\overrightarrow{(x \cdot \overline{x})}) \quad (7)$$

$$c := \text{mean}((\overrightarrow{y \cdot \overline{y} \cdot r})) - er \cdot \text{mean}(\overrightarrow{(y \cdot \overline{y})}) \quad (8)$$

$$d := \text{mean}(\overrightarrow{(Q \cdot r)}) - er \cdot \text{mean}(\overrightarrow{(Q)}) \quad (9)$$

$$f := 2 \cdot \frac{c-b}{d} \quad (10)$$

$$k := \frac{f + \sqrt{f^2 + 4}}{2} \quad (11)$$

$$acp := \frac{1}{\sqrt{k^2+1}} \quad (12)$$

Where:
acp=optimum solution for "a",
$x_i$ are samples of array x, where i=1 to integer N,
$y_i$ are samples of array y, where i=1 to integer M, and
$Q_i$ are samples of array Q, where i=1 to integer K.

In various embodiments, the first entity 102 determines a solution (e.g., optimum solution acp for a and thcp for thdf) for a first weighting of a first polarization channel, determines a second weighting of a second polarization channel based in part on the solution and determines a carrier phase shift for at least one of the first polarization channel or the second polarization channel based in part on one or more complex arrays of the first wireless signal. The first entity 102 can then create a signal having the transmit polarization that matches, or at least approximates, the received polarization by applying the first weighting to the first polarization channel of an arbitrary-polarized transmitter 109, applying the second weighting to the second polarization channel of the arbitrary-polarized transmitter 109 and applying the carrier phase shift to at least one of the first polarization channel or the second polarization channel of the arbitrary-polarized transmitter 109.

In various embodiments, the first entity 102 adjusts a transmit polarization state of its arbitrary-polarized transmitter 109 based at least in part on the determined received polarization state 120. As an example, the first entity 102 applies a normalized magnitude weight "acp" to a vertical transmitter channel of its arbitrary-polarized transmitter 109, applies a normalized magnitude weight of "$(1-acp^2)^{0.5}$" to a horizontal transmitter channel of its arbitrary-polarized transmitter 109 and applies an additional carrier phase shift of "thcp" to the horizontal transmitter channel of its arbitrary-polarized transmitter 109.

Figure 2:
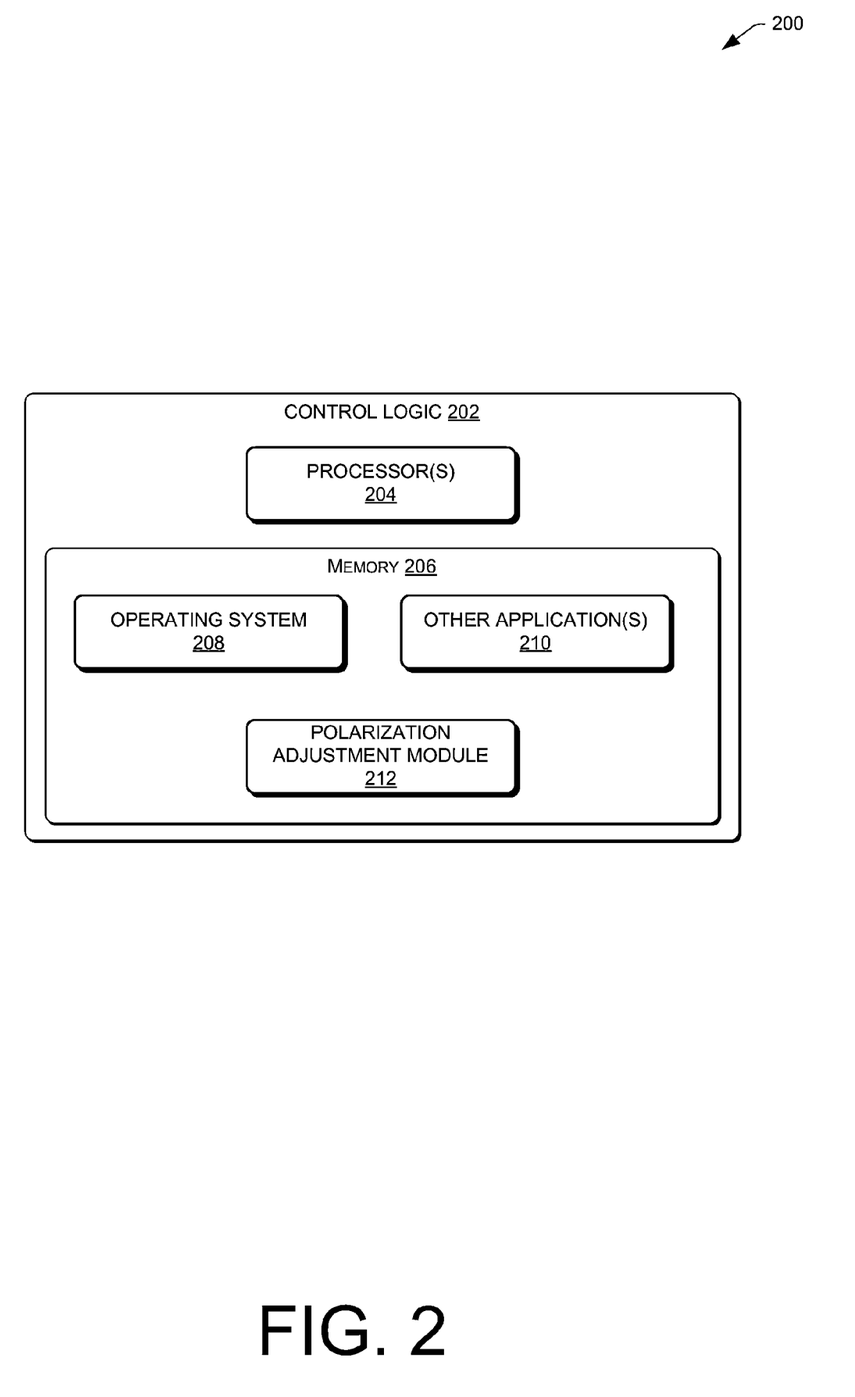
FIG. 2 is a block diagram that illustrates example control logic for determining a polarization of a received signal and adjusting a polarization state for a transmitted signal.

FIG. 2 is a block diagram that illustrates an environment 200 that includes control logic 202 for implementing an APA algorithm. Control logic 202 may include one or more processors 204 and memory 206. Control logic 202 may be integrated with, interfaced to or external to an entity, such as first entity 102. Control logic 202 may include various modules stored in memory 206, such as an operating system 208, other applications 210 and polarization adjustment module 212, implemented as software, firmware, hardware logic, and/or combinations thereof. Various components of control logic 202 may be optional, such as operating system 208 and/or other applications 210.

As an example, polarization adjustment module 212 can be configured to control a non-coherent fully arbitrary-polarized receiver that uses non-coherent demodulation, that may include two receive antennas having non-equal polarization to emulate a single receive antenna having adjustable receive polarization states. As an example, polarization adjustment module 212 can be configured to adjust arbitrary-polarized receiver 111 to a receive polarization state 119 that maximizes a Signal to Interference plus Noise Ratio (SINR) of a received wireless signal received from an entity, such as second entity 104.

As another example, polarization adjustment module 212 determines or estimates a polarization state 120 of a polarization of a wireless signal received at receive antennas 112 of a non-coherent receiver 111 by calculating a solution for a (e.g., acp) and a solution for thdf (e.g., thcp), using techniques and calculations as described herein. Thus, in various embodiments, polarization adjustment module 212 can determine or closely estimate a received polarization state represented by point 120 for polarized uplink signal 114. Polarization adjustment module 212 can also be configured to identify an entity associated with each received wireless signal, and store calculated and/or determined parameters (e.g., received power levels, SNR, SINR, determined polarization states, polarization state values, weighting values, carrier phase shift values, entity identifiers (ID), etc.) associated with each entity in memory 206 or other storage (not shown).

Polarization adjustment module 212 can also be configured to control a fully arbitrary-polarized (e.g., transmitter 109) that may include two transmit antennas having non-equal polarization to emulate a single transmit antenna having fully adjustable transmit polarization states. As an example, polarization adjustment module 212 may be configured to adjust the arbitrary-polarized transmitter to a transmit polarization state that maximizes a Signal to Interference plus Noise Ratio (SINR) of a received wireless signal received at an entity, such as second entity 104 without knowledge of the interference and noise environment as observed by 104.

As another example, polarization adjustment module 212 can be configured to control a fully arbitrary-polarized transmitter (e.g., transmitter 109) to transmit a wireless signal at any polarization state to a receiving entity for demodulation of the wireless signal. Polarization adjustment module 212 can be configured to access stored parameters associated with each particular entity to control parameters, including a transmit polarization state of a transmitted wireless signal, that is specific to each entity.

In various embodiments, polarization adjustment module 212 can be configured to transmit a signal to an entity having a transmit polarization that matches, or at least approximates, a received polarization of a signal received from the entity. As an example, polarization adjustment module 212 applies a first weighting (e.g., a normalized magnitude weight) to a first polarization channel of an arbitrary-polarized transmitter 109, applies a second weighting to a second polarization channel of the arbitrary-polarized transmitter 109 and applies a carrier phase shift to at least one of the first polarization channel or the second polarization channel of the arbitrary-polarized transmitter 109. Polarization adjustment module 212 is shown as a single component for purposes of illustration, however, its functionality can be distributed across multiple components.

Methods associated with algorithms described herein may be implemented in the general context of control logic 202 that may include computer-executable instructions stored on a computer-readable media. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Example Method

Figure 3:
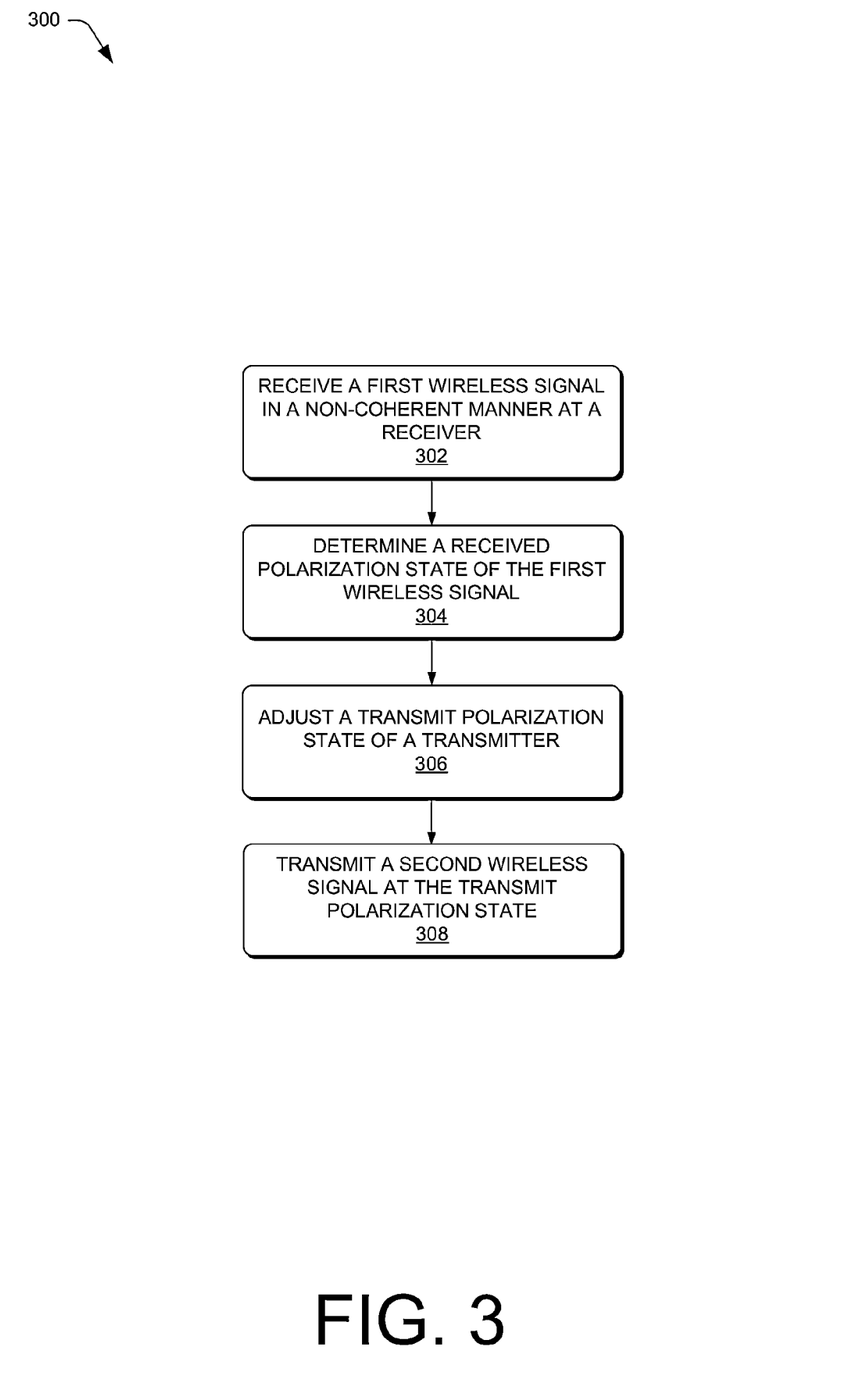
FIG. 3 is a flowchart showing an example method for determining and adjusting polarization states.

FIG. 3 is a flowchart showing an example method 300 for adjusting a polarization state of a transmitted signal, for example, in a non-coherent wireless system or a coherent system where a signal is received at a low SINR that precludes carrier recovery of the received signal. At item 302, a wireless receiver receives a first wireless signal in a non-coherent manner. As an example, the wireless receiver is a non-coherent wireless receiver that receives the first wireless signal in a non-coherent manner. As another example, the wireless receiver is a coherent wireless receiver that receives the first wireless signal in a non-coherent manner, such that the first wireless signal is received at the coherent wireless receiver with a SINR that precludes successful carrier recovery by the coherent wireless receiver. As an example, first entity 102 includes a fully arbitrary-polarized receiver 111 that receives polarized uplink signal 114 from second entity 104 (e.g., a wireless endpoint), and uses the algorithms described in U.S. application Ser. No. 13/529,968 to optimally determine point 119 (e.g., optimal SINR) to demodulate polarized uplink signal 114 in the presence of noise and interference. At 304, a received polarization state of the first wireless signal is determined. As an example, polarization adjustment module 212 determines or closely approximates a received polarization of the first wireless signal using the techniques described herein to find a solution that identifies a matching polarization state of polarized uplink signal 114 at point 120 on Poincaré Sphere 122.

At 306, a transmit polarization state of a transmitter is adjusted based at least in part on the determined received polarization state of the first wireless signal. As an example, polarization adjustment module 212 adjusts transmitter 109 to polarization state 124 in response to associating polarization state 120 with second entity 104. First entity 102 can associate a received polarization state with each corresponding entity that transmits, or has transmitted, a signal to first entity 102. As an example, polarization adjustment module 212 adjusts transmitter 109 to a transmit polarization state 124 that matches, closely matches, or approximates a polarization of polarized uplink signal 114 as received at receive antennas 112 at receiver 111.

At 308, a second wireless signal is transmitted at the transmit polarization state. As an example, when transmitting a signal to second entity 104, polarization adjustment module 212 adjusts its fully arbitrary-polarized transmitter 109 (e.g., of a concentrator or a repeater) to transmit polarized downlink signal 132 to second entity 104 (e.g., an endpoint) at a polarization state 124 associated with second entity 104. As an example, the transmit polarization state is adjusted to the determined received polarization state and the first wireless signal and the second wireless signal include wireless signals of a non-coherent system.

As described herein, the received polarization state can be determined by determining a solution (e.g., an optimum solution) for a first weighting of a first polarization channel, determining a second weighting of a second polarization channel based at least in part on the solution, and determining a carrier phase shift for least one of the first polarization channel or the second polarization channel based in part on one or more complex arrays of the first wireless signal. As an example, the second wireless signal is transmitted using the adjusted transmit polarization state based at least in part on applying the first weighting to the first polarization channel of the transmitter 109, applying the second weighting to the second polarization channel of the transmitter 109 and applying the carrier phase shift to at least one of the first polarization channel or the second polarization channel of the transmitter 109.

In various embodiments, determining the received polarization state of the first wireless signal is based at least in part on a mean of a complex array of a vertical component of the first wireless signal and a complex array of a horizontal component of the first wireless signal, as well as a power array of a signal reference.

Due to the nature of systems using D-pol antennas, the relative orientation of the vertical and horizontal polarizations between transmit and receive antennas may vary based on inherent sources of transmit-receive antenna polarization misalignment, such as polarization scattering in a communication path, fading differences in vertical and horizontal signal components, etc. Thus, as an example, due to inherent sources of transmit-receive antenna polarization misalignment, the received polarization of a first wireless signal received at first entity 102 can differ from a transmitted polarization of the first wireless signal transmitted by second entity 104. In various embodiments, by determining a received polarization state of a signal from each entity, wireless signals can be transmitted back to each entity using a transmit polarization state that improves or optimizes signal quality (e.g., SNR, SINR, etc.) at each entity in the presence of polarization misalignment that can occur in a communications path.

For the purposes of this disclosure a concentrator or repeater can be any transceiver that is utilized as wireless network infrastructure such as a base station that facilitates communication between network devices and the central control and data facility. Endpoints may be typically integrated within, or in close proximity to, a utility meter, but typically do not serve to facilitate communications between other network devices. In mesh configurations, endpoints can serve as both network infrastructure and as a meter endpoint. For the purposes of this disclosure, endpoints then take on the role of a concentrator or repeater. Concentrators and endpoints are convenient ways to generally refer to the two classes of network devices; one who's cost structure and size allow for the incorporation of adaptive polarization on both the transmitter and receiver and one, generally the low cost user equipment or endpoint that has none or just receiver APA capability.

Conclusion

Various aspects of an Adaptive Polarization Array (APA) Algorithm have been described for finding a solution for an optimal transmit polarization.

Additionally, while various discreet embodiments have been described throughout, the individual features of the various embodiments may be combined to form other embodiments not specifically described. The embodiments formed by combining the features of described embodiments may be applied to any signal-quality metric of interest.

We claim:

1. A method comprising:
   receiving a first wireless signal in a non-coherent manner at a receiver;
   determining a received polarization state of the first wireless signal;
   adjusting a transmit polarization state of a transmitter to an adjusted transmit polarization state based at least in part on the determined received polarization state; and
   transmitting a second wireless signal at the adjusted transmit polarization state, wherein determining the received polarization state of the first wireless signal is based at least in part on a mean of a complex array of a vertical component of the first wireless signal and a complex array of a horizontal component of the first wireless signal.

2. The method as recited in claim 1, wherein:
   the first wireless signal and the second wireless signal include wireless signals of a non-coherent system; or
   the first wireless signal and the second wireless signal include wireless signals of a coherent system, and the first wireless signal is received at a Signal to Interference plus Noise Ratio (SINR) that prevents successful carrier recovery of the first wireless signal by the receiver.

3. The method as recited in claim 1, wherein:
   the receiver is an arbitrary-polarized receiver; and
   the transmitter is an arbitrary-polarized transmitter that includes at least two transmit antennas having non-equal polarization to emulate a single transmit antenna having adjustable transmit polarization states.

4. The method as recited in claim 1, wherein the adjusting the transmit polarization state of the transmitter comprises adjusting the adjusted transmit polarization state to the determined received polarization state.

5. The method as recited in claim 1, wherein the determining the received polarization state includes:
   determining a solution for a first weighting of a first polarization channel of the transmitter;
   determining a second weighting of a second polarization channel of the transmitter based at least in part on the solution; and
   determining a carrier phase shift for at least one of the first polarization channel or the second polarization channel based at least in part on one or more complex arrays of the first wireless signal.

6. The method as recited in claim 5, wherein the adjusted transmit polarization state is based at least in part on:
   applying the first weighting to the first polarization channel of the transmitter;
   applying the second weighting to the second polarization channel of the transmitter; and
   applying the carrier phase shift to at least one of the first polarization channel or the second polarization channel of the transmitter.

7. The method as recited in claim 1, wherein the receiver receives the first wireless signal in the non-coherent manner from an endpoint.

8. The method as recited in claim 7, wherein the second wireless signal is transmitted to the endpoint.

9. The method as recited in claim 1, wherein receiving the first wireless signal and transmitting the second wireless signal is performed by a concentrator or a repeater.

10. The method as recited in claim 1, wherein determining the received polarization state of the first wireless signal is based at least in part on a power array of a signal reference.

11. The method as recited in claim 1, wherein the received polarization state of the first wireless signal differs from a transmitted polarization state of the first wireless signal based at least in part on polarization scattering or fading differences in vertical and horizontal signal components in a channel used to transmit the first wireless signal.

12. A system comprising:
    a receiver;
    an arbitrary-polarized transmitter having adjustable transmit polarization states; and
    control logic configured to:
      calculate a polarization state of a first dual-polarized signal received in a non-coherent manner at the receiver; and
      adjust a transmit polarization state of the arbitrary-polarized transmitter to transmit a second dual-polarized signal having a polarization at the calculated polarization state, wherein the transmit polarization state of the arbitrary-polarized transmitter is adjusted based at least in part on:
        applying a first normalized magnitude weight to a vertical transmitter channel of the arbitrary-polarized transmitter;
        applying a second normalized magnitude weight to a horizontal transmitter channel of the arbitrary-polarized transmitter; and
        applying the carrier phase shift to at least one of the vertical transmitter channel or the horizontal transmitter channel of the arbitrary-polarized transmitter.

13. The system as recited in claim 12, wherein the arbitrary-polarized transmitter includes at least two transmit antennas having non-equal polarization to emulate a single transmit antenna having the adjustable transmit polarization states.

14. The system as recited in claim 12, wherein:
    the receiver receives the first dual-polarized signal from an entity; and
    the second dual-polarized signal is transmitted having the polarization at the calculated polarization state to the entity.

15. The system as recited in claim 12, wherein the calculated polarization state is based at least in part on determining a normalized weighting of a first polarization channel and an added phase differential of a horizontal carrier relative to a vertical carrier.

16. Control logic comprising:
    memory;
    one or more processors;
    at least one module stored on the memory and executable by the one or more processors, the at least one module configured to:
      estimate a received polarization state of a first wireless signal received in a non-coherent manner at a receiver from an entity;
      determine values associated with the estimated received polarization state; and
      apply the values to adjust an arbitrary-polarized transmitter to transmit a second wireless signal at the estimated received polarization state to the entity, wherein the values include weighting values and a carrier phase shift.

17. The control logic as recited in claim 16, the at least one module is further configured to, upon determining a requirement to transmit a third wireless signal to the entity, apply the values to adjust the arbitrary-polarized transmitter to transmit the third wireless signal at the estimated received polarization state to the entity.

* * * * *